United States Patent

[11] 3,528,383

| [72] | Inventor | Karl L. Fetters<br>2 Oak Drive, Poland, Ohio 44514 |
|---|---|---|
| [21] | Appl. No. | 711,616 |
| [22] | Filed | March 8, 1968 |
| [45] | Patented | Sept. 15, 1970 |

[54] BOAT FENDERS
12 Claims, 4 Drawing Figs.

[52] U.S. Cl. .................................................. 114/220, 61/48
[51] Int. Cl. ............................................. B63b 59/02
[50] Field of Search .................................. 114/219, 220; 61/48

[56] References Cited

UNITED STATES PATENTS

| 79,235 | 6/1868 | Lake ........................... | 114/220 |
| 1,145,749 | 7/1915 | Claud .......................... | 114/220 |
| 1,781,403 | 11/1930 | Lyons .......................... | 114/220 |
| 2,417,849 | 3/1947 | Walters, et al. ............... | 114/220 |

FOREIGN PATENTS

| 3,266 | 1874 | Great Britain ............ | 114/220 |
| 904,307 | 8/1962 | Great Britain ............ | 114/220 |

Primary Examiner—Milton Buchler
Assistant Examiner—James E. Pittenger
Attorney—Buell, Blenko and Ziesenheim ABSTRACT: I disclose an improved fender or bumper for protecting boats and similar vessels from contact with pilings, locks or the like or while at dock, approaching a dock or wharf or when two or more vessels are moored together. My invention includes a number of bracket members holding at least two rotatable bumpers in contact with the boat and at least one additional rotatable bumper spaced therefrom for contact with another boat or with a dock or other stationary structure.

Patented Sept. 15, 1970 3,528,383
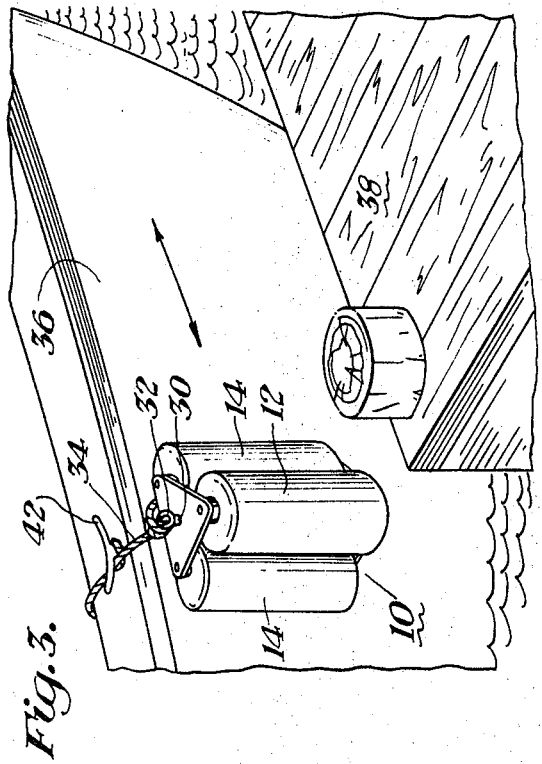
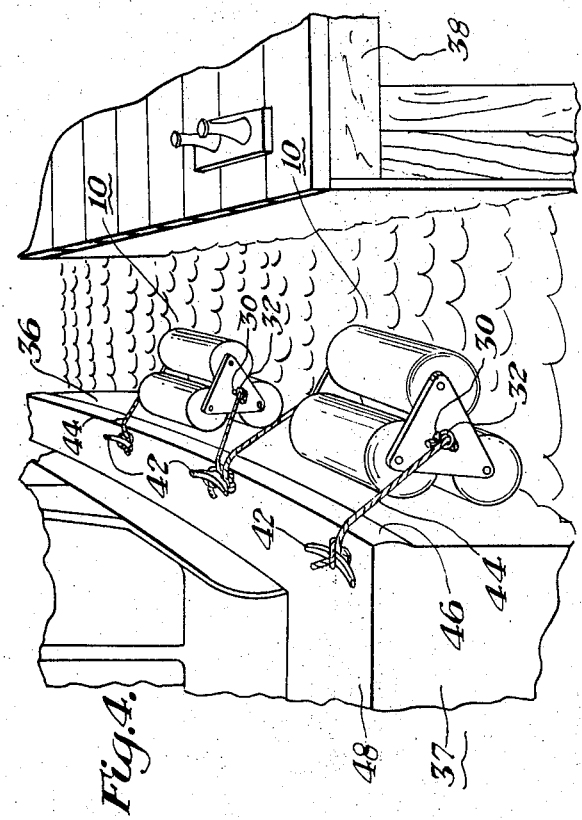
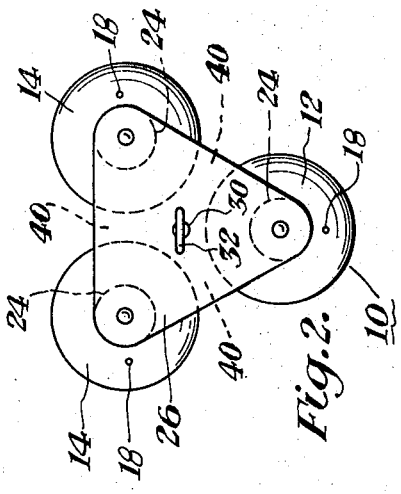
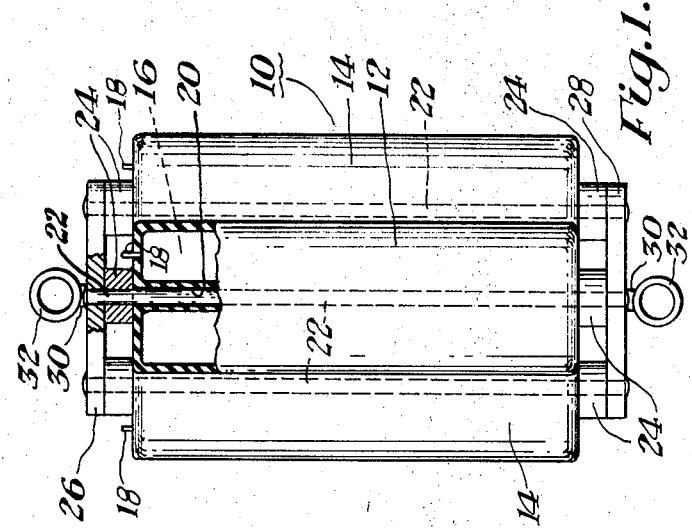
INVENTOR
Karl L. Fetters.
BY
HIS ATTORNEYS.

BOAT FENDERS

My present invention relates to boat fenders or bumpers and more particularly to a fender structure capable of permitting relative movement between the boat and another boat or solid structure without damage to either or to the fender.

When a boat or other vessel is brought near to contact with a dock, wharf, lock, piling, or another vessel, fenders or bumpers are usually employed for protecting the gunwales and sides of the vessel or vessels from damaging contact. The fenders are fabricated from resilient materials to protect the vessel from marring or other damage as the vessel moves owing to wind and water currents. In the past, fenders have been made of rope, rubber or synthetic materials (sometimes inflated), cork, canvas stuffed with ground cork or kapok, and various types of plastic foams. Occasionally, cylindrical, square or rectangular sections of logs or timbers have been used when marring of the vessel is of less consequence.

The shapes of boat fenders vary considerably, although those in common usage are usually cylindrical in shape. By some it is said that fenders of square section offer better protection in some cases. I have found, however, that using conventional fenders of either cylindrical or square configuration tends to mar the finish of the boat and to cause more serious damage in certain instances.

For example, cylindrical bumpers, such as the "Par Air" Better Boat Bumpers (Manhattan Marine & Electric Co.) are used in either the vertical or horizontal positions. The fenders are supported by a length of rope secured to a deck cleat, with their long axes vertical as the vessel approaches a dock or the like. As the vessel moves forward with the fender touching both the vessel and the dock, the fender will rotate clockwise. This has the undesirable effect of tending to roll the vertical fender aft along the side of the vessel. After a revolution or two the fender becomes canted or inclined and commences to drag and scrape along the side of the vessel and dock and to damage both the vessel and its fender. From the various fore and aft motions of the vessel at a mooring, it is readily seen that the finish of the vessel is quickly marred and that the vessel may be even structurally damaged.

Often conventional fenders are severely damaged or destroyed in the process. Where the vessel is moored for any length of time, the wind and water currents causing longitudinal movement of the vessel relative to the dock can quickly eliminate the usefulness of these conventional fenders. It is not uncommon to see conventional fenders almost completely destroyed from chafing. Chafing may quickly puncture conventional inflatable fenders. In any case, the vessel is soon left unprotected.

When a vessel is transiting along a dock or is moored in any area where water level is changing owing to waves, tides or loading of the vessel, it is a common practice to support cylindrical fenders with their long axes in a horizontal position. This causes the fenders to roll vertically as the boat changes elevation relative to the dock or wharf. Conventional fenders are usually translated to scrape and chafe the sides of the vessel when mounted horizontally and there is also longitudinal movement of the vessel relative to the dock or the like. If the water level and the vessel fall significantly relative to the dock, conventional fenders can roll above the gunwales leaving the vessel with no protection.

I overcome these disadvantages of the prior art by providing a boat fender having a number of clustered cylindrical members or rolls. The members are spacedly mounted so that the rotation of one of the members when contacting a dock or other stationary structure or another vessel will not cause others of the members to rotate in contact with the boat. In consequence, my improved boat fender is not displaced longitudinally of the boat as the latter approaches the dock, nor can my improved fender be displaced topside and over the gunwale when it is used in the horizontal position.

Chafing of the fender is largely if not completely eliminated by my invention as the rotatable elements thereof cannot be rollingly engaged by moving contrariwise surfaces. Although three or more rotatable members can be used in my novel boat fender, it is generally desirable to have a greater number of rotatable members contacting the side of the boat than are positioned for contact with a stationary structure of another vessel. Thus, the external rollers will be set into rotative motion in preference to displacing the boat fender relative to the boat on which it is employed. Where a relative motion component exists which is parallel to the rotative axes of my novel fender, the fenders will translate relative to the external object rather than to the boat side to avoid chafing the boat.

Various types of resilient materials can be used for constructing the boat fenders of my invention. A desirable construction is a natural or synthetic elastomeric material shaped for inflation by air or other suitable gas. The rollers constructed in this fashion desirably are provided with central or axial passage means for a support rod or axle. It will be understood of course that other resilient materials of either solid or composite construction can be employed instead. For example, any of the materials mentioned previously can be employed as long as they are provided with the aforementioned axial passage such that the fender rolls can be rotatably mounted in the manner explained below.

I accomplish these desirable results by providing a boat fender comprising a plurality of rolls, a supporting member for rotatably mounting said rolls in spaced relation one to the other, and said member having a securance element for securing said fender to said boat.

I also desirably provide a similar boat fender wherein said member includes a pair of end brackets and a number of axles inserted respectively through said rolls and secured adjacent their ends to said end brackets.

I also desirably provide a similar boat fender wherein an additional axle is centrally secured adjacent its ends to said end brackets, said additional axle being mounted in the space between said rolls, and an eye bracket is secured to the outward surface of each of said end brackets for suspending said fender at either end thereof.

I also desirably provide a similar boat fender wherein three such rolls are employed and are disposed in a triangular array.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 1 is a front elevational view of one form of boat fender arranged in accordance with my invention;

FIG. 2 is a top plan view of the boat fender shown in FIG. 1;

FIG. 3 is an isometric view illustrating an exemplary application of my novel boat fender; and FIG. 4 is a similar view illustrating another application of my boat fender.

Referring now to FIGS. 1 and 2 of the drawings, the exemplary form of my boat fender 10 shown therein comprises an outward roll 12 and a pair of inward rolls 14. In this example, each of the rolls 12 or 14 is constructed from a suitable elastomeric material such as neoprene. The rolls 12 and 14 are hollow in construction and are provided with central or axial passage means 16 and a suitable air valve 18 of conventional construction for inflating the rolls. It will be understood of course that a solid elastomeric or other resilient material can be employed as long as the roll is provided with a central passage 20 for the accommodation of supporting axle 22.

Each roll 12 or 14 has affixed to the respective ends thereof a pair of spacers or hubs 24 for spacing the ends of the rolls 12, 14 from end brackets 26, 28. The end portions of the axles 22 can be conveniently secured to the end brackets 26, 28 as by swaging, welding or pinning. This maintains together the assembly of the rolls 12, 14, axles 22, and upper and lower end plates or brackets 26, 28 as just described.

For supporting the boat fender 10 and for further aid in securing the aforedescribed assembly, a central rod 30 (FIGS. 2 and 4) is inserted through suitable apertures therefor in the upper and lower end brackets 26, 28. A securance element such as eye bracket 32 is secured to each end bracket 26 or 28, for example to the adjacent end of the central supporting rod 30 for the purpose of suspending the boat fender 10 by means of deck cleats 42 (FIGS. 3 and 4) and lengths of rope 34 or 44 or the like. Each of the rolls 12, 14 is spacedly mounted relative to the other rolls so that each roll can be rotated independently of the other.

In this example three such rolls 12, 14 are arranged in a triangular array. The roll array preferably is symmetrical about the bracket axle 30 so that the fender can be used in any one of its three possible positions, with two of the rolls contacting the side 36 of the boat (FIGS. 3 and 4). The remaining roll 12 is then free for rotative contact with an external object. All of the rolls 12, 14 are spaced such that rotation of a given roll does not necessitate rotation of one or more of the other rolls.

In operation, as shown in FIG. 3 of the drawings, a rope 34 or other flexible connection is secured to deck cleat 42 and to eye bracket 32 of the central supporting rod 30 of my improved boat fender. The boat fender 10 is thereby supported in its vertical position relative to the boat 36 and dock 38 or the like. The initial contact between the outward roll 12 with the adjacent edge of the dock 38 will initiate rolling of the outward roll 12 without causing rolling of the inward rolls 14. This results from the spaces 40 (FIG. 2) among the several rolls 12, 14.

Additionally, the use of more inward rolls 14 relative to the outward or contact roll 12 ensures setting of the outward roll 12 in motion without displacement of the boat fender 10. Thus, when the boat 36 approaches the dock 38, or the like, the fender 10 is not rolled between the boat and the dock. Rather, in the arrangement of FIG. 3, only the outward roll 12 is rotated. By the same token, there is no possibility of canting of the boat fender 10 relative to the side of the boat 36 nor of the fender 10 chafing the finish of the side of the boat 36.

In the operation of my novel boat fender in accordance with FIG. 4 of the drawings, one or more of the fenders 10 are supported in a horizontal position from deck cleats 42. In this case, suitable lengths of rope 44 are secured respectively to each end of the fender 10 by means of its securance elements or eye brackets 32. Here again relative movement in a vertical direction between the boat or other vessel 36 and the dock 38 or the like will not displace the boat fender 10 relative to the side of the boat 36. Instead, any such relative movement will result in rotation of the outward roll 12, which is spaced from the inward rolls 14 for this purpose. Thus, the inward rolls 14 cannot chafe the sides of the vessel 36 nor can the fender 10 be rolled topside over gunwale 46 and onto deck 48 of the vessel 36. If the boat 36 moves longitudinally of the dock 38, the greater combined contact area of the inward rolls 14 (as compared to the contact area of the outward roll 12) will usually result in translation of the fender 10 relative to the dock 38 rather than to the boat 36.

When severe contact forces develop, the entire fender 10 can rotate, owing primarily to its support from the central rod or axle 30. The use of an odd number of rolls 12, 14 also facilitates rotation of the entire fender 10 (relative to the adjacent ends of the supporting ropes 34, 44). The ability of the entire assembly of the fender 10 to rotate is useful, particularly when the boat is mishandled during the docking operation.

It will be understood that the fenders 10 can be made of various lengths depending upon the size of the vessel with which it is to be used. By the same token the diameters of the rolls 12 and 14 can be made larger or smaller. Depending on the specific application of the invention, the inward or boat contacting rolls 14 can be provided with a different diameter than that of outward or external object contacting roll 12. It is also contemplated that the inward rolls 14 can be provided as inflatable elastomeric shapes of a texture which would cause the least marring of the boat finish, while the outward roll 12 can be fabricated from a sturdier material such as wood. The latter arrangement is advantageous where the boat may be moored for extended periods of time and relative motions caused by tides, waves, or wind and water currents would otherwise result in accelerated wearing of the outward roll 12 relative to the inward roll 14. The use of a material such as wood in this case would lessen replacement costs of the outward roll 12.

It is also contemplated depending upon the size of the vessel 36, that the boat fender 10 can be provided with additional outward and inward rolls similar to the rolls 12 and 14 respectively. In any event, the number of inward or vessel contacting rolls desirably is greater than that of the outward roll or rolls so that the greater inertia of the inward rolls ensures commencement of rotation in the outward roll or rolls before a chafing translation of the boat fender can occur, or of rotation of the entire fender 10 in cases of severe contact.

From the foregoing it will be apparent that novel and efficient forms of boat fenders have been described herein. While I have shown and described certain presently preferred embodiments of the invention and have illustrated presently preferred methods of practicing the same, it is to be distinctly understood that the invention is not limited thereto but may be variously embodied and practiced within the spirit and scope of the invention.

I claim:

1. A fender for a boat, said fender comprising a plurality of rolls disposed in a symmetrical array, a supporting member for rotatably mounting each of said rolls in parallel spaced relation one to the other so that each of said rolls can be rotated freely of the remainder thereof, and said member having a securance element for securing said fender to said boat, said securance element being located substantially centrally of said supporting member, said rolls being disposed in a symmetrical array about said securance element so that said fender, including said supporting member can rotate about said securance member as an axis.

2. The combination according to claim 1 wherein said member includes a pair of end brackets and a number of axles inserted relatively rotatably and respectively through said rolls and secured adjacent their ends to said end brackets.

3. The combination according to claim 2 wherein each of said rolls is provided with a hub member at each end thereof for spacing said end brackets from said rolls.

4. The combination according to claim 1 wherein three such rolls are employed and are disposed in an equilateral triangular array.

5. The combination according to claim 2 wherein said securance member includes an additional axle centrally secured adjacent its ends to said end brackets, said additional axle being mounted in the space between said rolls, and an eye bracket is secured to each end of said additional axle for suspending said fender at either end thereof.

6. The combination according to claim 1 wherein those rolls for normally contacting said boat are fabricated from an inflatable elastomeric structure and a remainder of said rolls is fabricated from a more durable material such as wood or rope.

7. The combination according to claim 1 wherein each of said rolls is fabricated from an inflatable elastomeric structure.

8. The combination according to claim 1 wherein said supporting member includes a pair of end plates and a number of axles secured adjacent their ends to said end plates, said rolls being rotatably mounted respectively upon said axles, and spacers are mounted on said axles and disposed between the ends of said rolls and each of said end plates respectively to further facilitate rotation of said rolls.

9. The combination according to claim 8 wherein said securance element includes an additional axle secured to said end plates and disposed centrally of the array defined by said first mentioned axles, and means secured to at least one end of said additional axle for securing said fender to said boat.

10. The combination according to claim 1 wherein flexible securing means are secured to said securance element and to said boat to facilitate rotation of said fender as a unit about said securance element and relative to said boat.

11. A fender for a boat comprising a plurality of rolls disposed in a symmetrical array, a supporting member for rotatably mounting said rolls in spaced relation one to the other so that each of said rolls can be rotated freely of the remainder thereof, and said member having a securance element for securing said fender to said boat, said securance member being located substantially centrally of said supporting member, each of said rolls being fabricated from an inflatable elastomeric structure, said inflatable structure including a tube extending therethrough, said tube defining a passage for an associated axle.

12. A fender for a boat comprising a pair of symmetrical end plates, a number of axles secured adjacent their ends to said end plates and disposed in a symmetrical array, a roll rotatably mounted on each of said axles, said axles being spaced and said rolls being shaped so that each of said rolls can rotate independently of the remainder thereof, spacers mounted on said axles and disposed between the ends of said rolls and each of said end plates to further facilitate rotation of said rolls, and securance means for securing said structure to said boat, said securance means being located substantially centrally of each of said end plates, those rolls for contacting said boat being fabricated from an inflatable elastomeric structure, and a remainder of said rolls being fabricated from a more durable non-inflatable material.